United States Patent
Krishnamurthy Sagar et al.

(10) Patent No.: US 11,240,421 B2
(45) Date of Patent: Feb. 1, 2022

(54) METHODS AND APPARATUS FOR DEFOCUS REDUCTION USING LASER AUTOFOCUS

(71) Applicant: QUALCOMM Incorporated, San Diego, CA (US)

(72) Inventors: Sanket Krishnamurthy Sagar, San Diego, CA (US); Ying Chen Lou, Escondido, CA (US); Ruben Manuel Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/754,048

(22) Filed: Jun. 29, 2015

(65) Prior Publication Data
US 2016/0301852 A1 Oct. 13, 2016

Related U.S. Application Data

(60) Provisional application No. 62/146,118, filed on Apr. 10, 2015.

(51) Int. Cl.
*H04N 5/232* (2006.01)
*G02B 7/38* (2021.01)
*G01B 11/14* (2006.01)

(52) U.S. Cl.
CPC ....... *H04N 5/232121* (2018.08); *G01B 11/14* (2013.01); *G02B 7/38* (2013.01); *H04N 5/232123* (2018.08)

(58) Field of Classification Search
CPC ............. H04N 5/23212; H04N 5/2625; H04N 5/23287; H04N 5/23296; G02B 7/28; G03B 13/32; G03B 13/36

(Continued)

(56) References Cited

U.S. PATENT DOCUMENTS

| 5,860,032 A | 1/1999 | Iwane |
| 7,423,686 B2 | 9/2008 | Yamashita |

(Continued)

FOREIGN PATENT DOCUMENTS

| CN | 101339349 A | 1/2009 |
| CN | 101852970 A | 10/2010 |

(Continued)

OTHER PUBLICATIONS

International Search Report and Written Opinion—PCT/US2016/023583—ISA/EPO—dated Jun. 21, 2016.

*Primary Examiner* — Nigar Chowdhury
(74) *Attorney, Agent, or Firm* — Qualcomm Incorporated

(57) ABSTRACT

Methods and imaging devices are disclosed for reducing defocus events occurring during autofocus search operations. For example, one method includes capturing a plurality of frames depicting a scene with an imaging device, selecting a portion of the scene of at least one frame that corresponds to an object of the scene, and detecting a change in the scene. The method further includes detecting a distance between the object and the imaging device for each of the plurality of frames, determining a lens position for each frame based on the determined distance of each frame and moving a lens toward the lens position of each frame while the scene continuously changes. The method also includes determining the scene is stable and initiating an autofocus search operation based on the determination that the scene is stable.

32 Claims, 5 Drawing Sheets

(58) Field of Classification Search
USPC ........ 348/345, 239, 208.11; 396/89, 125, 82
See application file for complete search history.

(56) References Cited

U.S. PATENT DOCUMENTS

| | | | | |
|---|---|---|---|---|
| 8,965,192 | B2* | 2/2015 | Iwasaki | H04N 5/23296 396/82 |
| 2002/0080257 | A1 | 6/2002 | Blank | |
| 2007/0104472 | A1* | 5/2007 | Quan | H04N 5/23218 396/79 |
| 2008/0002960 | A1* | 1/2008 | Ito | G03B 13/36 396/125 |
| 2008/0218611 | A1 | 9/2008 | Parulski et al. | |
| 2009/0009651 | A1* | 1/2009 | Takayanagi | G03B 13/36 348/345 |
| 2010/0020222 | A1 | 1/2010 | Jones et al. | |
| 2010/0060780 | A1* | 3/2010 | Shibagami | G02B 7/08 348/345 |
| 2010/0208091 | A1* | 8/2010 | Chang | H04N 5/23212 348/222.1 |
| 2010/0208126 | A1* | 8/2010 | Uenishi | H04N 5/23212 348/345 |
| 2010/0209094 | A1* | 8/2010 | Uehara | H04N 5/23258 396/125 |
| 2011/0149117 | A1* | 6/2011 | Vendrig | H04N 5/2226 348/239 |
| 2011/0168890 | A1 | 7/2011 | Strandemar et al. | |
| 2012/0188386 | A1* | 7/2012 | Kulkarni | H04N 5/23212 348/208.11 |
| 2012/0200723 | A1* | 8/2012 | Yano | G03B 15/05 348/211.2 |
| 2012/0281132 | A1* | 11/2012 | Ogura | G06T 5/003 348/348 |
| 2013/0208481 | A1* | 8/2013 | Sooferian | F21V 14/06 362/280 |
| 2013/0222633 | A1* | 8/2013 | Knight | H04N 5/232125 348/222.1 |
| 2013/0314579 | A1* | 11/2013 | Sasaki | G03B 13/36 348/333.02 |
| 2014/0176786 | A1* | 6/2014 | Iwasaki | H04N 5/232133 348/351 |
| 2014/0186017 | A1* | 7/2014 | Shibata | G03B 5/00 396/55 |
| 2014/0212123 | A1* | 7/2014 | Sato | G03B 9/06 396/510 |
| 2014/0253783 | A1 | 9/2014 | Springer et al. | |
| 2014/0267757 | A1 | 9/2014 | Abramson et al. | |
| 2014/0276088 | A1* | 9/2014 | Drucker | A61B 5/0082 600/473 |
| 2015/0002703 | A1* | 1/2015 | Curti | H04N 5/23296 348/240.99 |
| 2016/0014404 | A1* | 1/2016 | Krestyannikov | H04N 5/23212 348/187 |
| 2016/0028936 | A1* | 1/2016 | Saphier | G02B 7/32 348/87 |
| 2016/0112612 | A1* | 4/2016 | Kakkori | G02B 7/04 348/373 |
| 2016/0209618 | A1* | 7/2016 | Avivi | G11B 7/093 |

FOREIGN PATENT DOCUMENTS

| | | |
|---|---|---|
| CN | 103398696 A | 11/2013 |
| CN | 103546692 A | 1/2014 |
| CN | 103595919 A | 2/2014 |
| CN | 103856717 A | 6/2014 |
| CN | 104052932 A | 9/2014 |
| CN | 104243828 A | 12/2014 |
| CN | 104503189 A | 4/2015 |

* cited by examiner

METHODS AND APPARATUS FOR DEFOCUS REDUCTION USING LASER AUTOFOCUS

CROSS REFERENCE TO RELATED APPLICATIONS

This application claims the benefit of U.S. Provisional Patent Application No. 62/146,118, entitled "DEFOCUS REDUCTION USING LASER AUTOFOCUS," filed on Apr. 10, 2015, which is hereby incorporated by reference in its entirety.

TECHNICAL FIELD

The present embodiments relate to imaging devices, and in particular, to methods and apparatus for automatic focusing of imaging devices.

BACKGROUND

The integration of digital processing technology with imaging devices has enabled more powerful and easier to use photographic products. For example, the ability to digitally control the shutter speed of an imaging device, aperture, and sensor sensitivity has provided for improved picture quality in a variety of imaging environments without the need for a photographer to manually determine and set these parameters for each environment.

Imaging devices having an automatic focusing capability (imaging devices and methods of which may be referred to herein simply as "autofocus") has also made capturing high quality photographs easier by enabling almost any photographer, regardless of skill, to obtain a clear image in most imaging environments. Autofocus may have also reduced the workload of professional photographers. This may enable the photographers to focus more of their energies on the creative aspects of their trade, with a corresponding increase in the quality of photographs produced by these photographers.

Existing autofocus search operations may result in several problems. For example, the search time to find an lens position for optimal focus may be longer due to the imaging device having to search in both directions, near and far, thus resulting in delay before a properly focused image may be captured. Because of this the rate of failed autofocusing may increase and the user may have an undesired experience because of defocusing at the beginning of the autofocus search operation instead of receiving a progressively sharper focus. As a result, during an autofocus search operation the user may view an image that is slightly out of focus, the autofocus search operation may then cause the image to be increasingly defocused while the imaging device searches in the incorrect direction, and finally the imaging device may search in the opposite direction to locate the lens position for optimal focus. There remains a need to remove this effect and minimize the time needed during an autofocus search operation.

SUMMARY

Some of the present embodiments may include a method for focusing an imaging device by determining which direction to first move a lens of the imaging device in order to obtain a quicker and sharper focus. This method may include capturing multiple image frames depicting a scene with an imaging device, selecting a portion of the scene of at least one frame that corresponds to an object of the scene, and detecting a change in the scene. In some embodiments, the imaging device is configured to operate in a continuous autofocus mode. The method also includes detecting a distance between the object and the imaging device for each of the image frames, and determining a lens position for each frame based on the determined distance of each frame. In some embodiments, the lens position is an estimate of the optimal focus lens position. The method further includes moving the lens toward the lens position of each frame while the scene continuously changes, determining the scene is stable, and initiating an autofocus search operation based on the determination that the scene is stable.

The method may further include monitoring the image frames, where monitoring the image frames includes determining a change quantifier for each frame and comparing the change quantifier for each frame to a threshold change quantifier. The change quantifier may be at least one of: a luma quantifier, a movement quantifier, and a distance quantifier. Detecting a change in the scene may be based on said monitoring, where a change in the scene is detected when the change quantifier for at least one frame is greater than the threshold change quantifier.

In some embodiments, determining a lens position for each image frame includes reporting the detected distance for each image frame by a distance sensor, receiving the detected distance for each image frame, and converting the detected distance for each image frame to a lens position for each frame based on at least one of: an anchor distance, an anchor lens position, and at least one imaging device specification.

In some embodiments, the method further includes determining a near and a far boundary limits based on the estimation of the optimal focus lens position. The moving the lens toward the lens position may include moving the lens toward the near boundary.

In some embodiments, initiating an autofocus search operation may include performing a fine autofocus search operation, and determining an actual optimal focus lens position, where the actual optimal focus lens position is close in proximity to the estimated optimal focus lens position and between the near and far boundary limits.

Another aspect includes an imaging device, for example, an apparatus for reducing defocus events occurring during autofocus search operations. The apparatus may include a lens that is configured to focus light from a scene at a focal plane of the lens, an image sensor, positioned approximately at the focal plane of the lens, that is configured to capture multiple image frames depicting a scene based on the focused light from the scene, a distance sensor that is configured to detect a distance between an object of the scene and the imaging device, a processor that is operably coupled to the image sensor and lens, and a memory component that is operably coupled to the processor. In some embodiments, the distance sensor comprises at least one of a laser sensor and a dual camera system, and the distance sensor can be further configured to report the detected distance for each frame The processor and the memory component may be collectively configured to select a portion of the scene of at least one frame that corresponds to the object in the scene, detect a change in the scene, determine a lens position for each frame based on the determined distance of each frame, move the lens toward the lens position of each frame while the scene continuously changes, determine the scene is stable, and initiate an autofocus search operation based on the determination that the scene is stable. In some embodiments, the lens position is an estimate of the optimal focus lens position In some embodiments, the processor and the memory component are further configured to monitor the multiple frames, determine a change quantifier for each frame, and compare the change quantifier for each frame to a threshold change quantifier. The change quantifier may be at least one of: a luma quantifier, a movement quantifier, and a distance quantifier. Detecting a change in the scene may be based on said comparison, where a change in the scene is detected when the change quantifier for at least one frame is greater than the threshold change quantifier.

In other embodiments, the processor and the memory component may be further configured to receive the detected distance for each frame and determine a lens position for each frame based on the detected distance for each frame and at least one of: an anchor distance, an anchor lens position, and at least one imaging device specification.

In still other embodiments, the processor and the memory component may be further configured to determine a near and a far boundary limit based on the determined lens position and move the lens toward the near boundary limit.

In some embodiments, the processor and the memory component may be further configured to perform a fine autofocus search operation, and determine an actual optimal focus lens position, wherein the actual optimal focus lens position is close in proximity to an estimated optimal focus lens position and between the near and far boundary limits.

In some embodiments, the memory component may include at least one of: an input processing module, a change determination module, a lens position determination module, a lens control module, a stability determination module, an autofocus control module, and a boundary limit determination module.

Another aspect includes an apparatus for reducing defocus events occurring during autofocus search operations. The apparatus may include a means for capturing multiple frames depicting a scene, a means for detecting a distance between an object of the scene and the imaging device, a means for selecting a portion of the scene of at least one frame that corresponds to the object in the scene, a means for detecting a change in the scene, a means for determining a lens position for each frame based on the determined distance of each frame, a means for moving the lens toward the lens position of each frame while the scene continues to change, a means for determining the scene is stable, and a means for initiating an autofocus search operation based on the determination that the scene is stable. In some embodiments, the apparatus may include a means for reporting the detected distance for each frame. In other embodiments, the means for determining a lens position may be configured to receive the detected distance for each frame, and determine a lens position for each frame based on the detected distance for each frame and at least one of: an anchor distance, an anchor lens position, and at least one imaging device specification. In some embodiments, the lens position is an estimate of the optimal focus lens position.

In other embodiments, the apparatus may further include a means for determining a near and a far boundary limit based on the estimate of the optimal focus lens position. The means for moving the lens may then be configured to move the lens toward the near boundary.

In another aspect, a non-transitory computer readable medium is provided. The non-transitory computer readable medium may include instructions that when executed cause a processor to perform a method for reducing defocus events occurring during autofocus search operations. The method may include capturing multiple frames depicting a scene with an imaging device, selecting a portion of the scene of at least one frame that corresponds to an object of the scene, detecting a change in the scene, detecting a distance between the object and the imaging device for each of the multiple frames, determining a lens position for each frame based on the determined distance of each frame, moving the lens toward the lens position of each frame while the scene continuously changes, determining the scene is stable, and initiating an autofocus search operation based on the determination that the scene is stable. In some embodiment, said determining a lens position for each frame may further include reporting the detected distance for each frame by a distance sensor, receiving the detected distance for each frame, and converting the detected distance for each frame to a lens position for each frame based on at least one of: an anchor distance, an anchor lens position, and at least one imaging device specification. In some embodiments, the method also may include determining a near and a far boundary limits based on the lens position, and said moving the lens may include moving the lens toward the near boundary.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION OF CERTAIN ILLUSTRATIVE EMBODIMENTS

Figure 1:
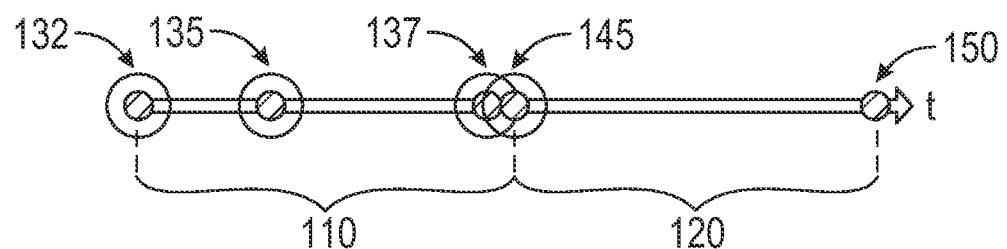
FIG. 1 illustrates an autofocus event timeline for an exemplary implementation of an autofocus event in an imaging device.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Autofocusing may be performed in an image device by a variety of types of actuators. Cameras focus scenes onto image sensors with lenses that move within a movable range to enable focusing. Autofocus imaging devices move the lens using voice coil motors (VCM), piezo, or MEMS solutions.

A variety of autofocus ("AF") methods may be used in modern digital imaging devices to determine the direction and how far the mechanical movement will move the lens. For example, because images with higher contrast may tend to have a sharper focus, some autofocus methods seek a lens position that provides an image with the highest contrast. This may be known as a focus value method, where focus values at different lens positions are compared to determine which image has the highest contrast. Another example of an autofocus method is based on object depth estimation, where the algorithm directly moves a lens to an estimated lens position based on the estimated depth or location of the target object from the imaging device. Based on the confidence in the estimation, minimal contrast based autofocusing may be required. However, when the lens position for an optimal focus is not known an imaging device may use the focus value method. The optimum lens position refers to the lens position which results in maximum focus value or highest contrast value.

Some implementations of the focus value method may start with not knowing the lens position of optimal focus for focusing on the target object. To start the autofocus search operation, the algorithm first searches for an lens position for optimal focus. The search begins by selecting a direction to move the lens to obtain successive sample image frames. The algorithm takes the successive image frames, compares the image frames, and determines the focus position direction based on the sample with the higher contrast.

The decision as to which direction to start a search is a difficult decision because at the outset of an autofocus search operation there is a lack of knowledge of the lens position for optimal focus of a target object. In some embodiments, the direction decision is based, in part, on current lens position and a pre-defined boundary. A pre-defined boundary can be a range of locations of an object relative to the imaging device. The boundaries may range between distances that are near to an imaging device and infinity. It should be realized that the pre-defined boundaries can vary for different imaging devices. In many imaging devices, the near position is about 10 centimeters from the camera and the infinity position is about 200 centimeters or more from the camera. As a result of this decision and the lack of knowledge of the lens position for optimal focus, the overall success rate of selecting the correct direction to move the lens is approximately 50%.

Some autofocus methods may suffer from an inability to achieve adequate focus in certain imaging environments. For example, imaging environments that present multiple objects within an image at different distances from the image sensor may make it difficult for an autofocus method to determine which object or objects of the multiple objects should be selected for focus. Other imaging environments may include objects in motion. Objects in motion may not be recognized by traditional autofocus methods. This may result in an inferior focus when compared to the methods disclosed herein.

Embodiments described herein include methods, apparatus, and a computer readable media that are configured to determine the direction to move a lens towards an optimal focus lens position at the outset, or prior to, an autofocus search operation of an imaging device. In some embodiments, the method may be directed to a method and image capture device that can determine an optimal focus lens position for each image frame of a scene being captured. By determining the optimal focus lens position and knowing a current lens position, the lens of the imaging device can be moved in the direction of the optimal focus lens position. This may result in potential improvements in autofocus speed and overall accuracy, thereby improving image quality in the image capture device. Accordingly, one embodiment introduces a software solution to determine an optimal focus lens position direction at the outset or before the initialization of an autofocus search operation.

In some embodiments of the methods and apparatus, the imaging device may include a distance sensor configured to determine the distance between the imaging device and a target object being focused on. In one embodiment, the distance sensor is a laser module or laser sensor. In another embodiment, the distance sensor may be a dual camera system. In some embodiments, the distance sensor can be configured to determine a distance between the imaging device and any one object of a single frame.

In some embodiments of the methods and apparatus, the imaging device may be configured to detect a change in the scene to be captured by the imaging device. A change in the scene may be represented by a user moving the imaging device from one intended image to a subsequent image, the object intended to be captured in moves, etc. The imaging device may be configured to detect the change in the scene and determine that a focus operation or autofocus search operation is required to focus on the scene prior to capturing an image. Some exemplary methods of detecting a change in the scene include, but are not limited to, comparison of successive image frames based on light intensity measurements (e.g., brightness or luma) of an image frame, gyroscopic or detection of physical movement of the imaging device, distances of a frames object between successive images, or any method to indicates to the imaging device that the scene has changed.

In some embodiments of the method disclosed herein, once a change in the scene is detected, the imaging device may be configured to estimate the optimal focus lens position for each image frame while the scene continues to change, either due to the user (e.g., the imaging device is panning) or due to image being captured. In some embodiments, the imaging device may utilize the distance sensor to determine the distance between the imaging device and the object for each image frame. The imaging device may estimate an optimal focus lens position for each image frame based on the determined distance for each image frame. Thus, even though the imaging device is panning or the scene is changing within each image frame (for example, the scene is not stable), the imaging device is able to determine the optimal focus lens position for each image frame.

In an illustrative embodiment of the method, the imaging device is then configured to move the lens toward the optimal focus lens position for each image frame while the scene continues to change and is not stable. Therefore, once the scene change has been detected, the lens is moved in the direction of the optimal lens focus position even though the device may still be panning or the image is not stable, unlike in traditional autofocus search methods. This is because the imaging device is capable of determining in which direction to move the lens as a result of the estimation of the optimal focus lens position based on the physical distance returned by the distance sensor for every frame (following a scene change). In this way, the imaging device knows the direction to move the lens and by what amount to move the lens. In contrast, traditional focus value method autofocus search operations do not know the direction or amount to move a lens while the scene changes, the imaging device is forced to wait until the scene is stable, and then, based on the comparison of the contrast or focus values for each frame, attempt to focus the scene.

In an illustrative embodiment, the methods and apparatus disclosed herein operate in a continuous autofocus mode. In some imaging devices, such as a camera in a mobile phone, continuous autofocus mode is a default selection. In other imaging devices, such as DSLR cameras, there are numerous modes that a user may choose from (e.g., Auto mode, Touch Autofocus mode, Continuous Autofocus mode, etc.). Continuous autofocus mode may be characterized by the continuous monitoring of successive or multiple image frames. In some embodiments of continuous autofocus mode, the imaging device selects an object of the scene, for example, an object located at the center of the scene, and continuously monitors that object in successive frames. In some embodiments, a user may select to exit or operate outside of continuous autofocus mode by selecting (e.g., via a touch screen or other input device) an object to focus on, thereby shifting the operation of the imaging device to focus on a user selected object and only monitor the selected image frame.

A "defocus event" is used herein as a broad term that refers to a scene being focused and then defocused while the system searches for the optimal focus by doubling over the same region of lens positions. One illustrative non-limiting advantage of the methods and apparatus disclosed herein is that defocus events are reduced because the lens is moved while the imaging device is panning or the scene is not stable, the occurrence of defocus events. Therefore, the lens is already closer to the optimal focus position prior to starting the autofocus search operation. The user would be less likely to see a defocusing event in the preview screen of an imaging device. Therefore, the methods and apparatus disclosed herein decrease defocus events significantly by moving the lens earlier and more accurately then traditional autofocus search operations.

Example implementations of the system and methods discussed above are described below in further detail in connection with FIGS. 1-5.

FIG. 1 illustrates an example of an autofocus event timeline for an exemplary implementation of an autofocus event in an imaging device. In the embodiments illustrated in FIG. 1, the timeline is plotted along an axis that represents the passage of time (t). Each autofocus event includes two components that relate to the speed and performance of the autofocus, the components being a monitor phase 110 and an autofocus search phase 120. In some embodiments, the autofocus event occurs entirely in continuous autofocus mode, including the monitor phase 110 and the search phase 120. The monitor phase 110 begins at start monitor phase point 132, where the imaging device continuously monitors each image frame of the scene for a change in the scene. Scene changes may be represented by the user causing the imaging device to pan or move and/or the scene being sought to be captured moves within the image frame of the imaging device. During the monitor phase 110, an imaging device, such as a camera in a mobile phone, detects a change in a tracked scene at point 135. The imaging device then monitors the panning of the imaging device or the scene change (e.g., determining that the scene is continuously changing), and then triggers the search phase at point 145 (e.g., triggers an autofocus search) once the scene is stable as determined at point 137.

Some implementations using a focus value autofocus method, described above, use the monitor phase 110 to continuously track a scene to detect the occurrence of a scene change and monitor the scene change to determine if the scene is stable. In some systems the imaging device does not move the lens during the monitor phase. Such imaging devices wait for the scene to become stable, and then switch to the autofocus search phase 120 where the lens is moved to locate the focus position based on focus or contrast values. However, the methods and apparatus disclosed herein, as will be discussed in detail below, enable movement of the lens during the monitor phase 110 prior to the autofocus search phase 120, thereby improving speed and overall accuracy of the autofocus of the imaging device.

The monitor phase 110 includes (i) detecting a scene change at point 135 on the timeline and (ii) determining whether the scene is stable within the imaging device or whether the imaging device is still panning, point 137. There are numerous methods that may be utilized to detect a scene change. For the purpose of illustration, three exemplary methods are described herein: (i) brightness (e.g., luma) based changes, (ii) imaging device directional movement based changes (e.g., changes in position or directional movement of the imaging device as determined by a gyroscope or accelerometer), and (iii) distance based scene changes (e.g., monitoring the distance between the imaging device and a scene via laser tracking). In some embodiments for each method, a threshold value can be set such that once the imaging device detects an image frame having a value equal to or greater than the threshold value the imaging device is configured to determine the scene has changed. In some embodiments, the scene change determination is made during the imaging device preview phase, where a user is able to view and frame an image on a display of the imaging device without actually capturing the image.

In some implementations, there is no definite or specific value for the threshold value. The threshold value selected may vary based on the modules, lens, and actuator utilized in each imaging device. Thus, the threshold values are an aspect of a tuning or calibration process where manufacturers can vary the threshold value based on preferences for each individual imaging device. For example, if the threshold is set to a small number, then the imaging device may be sensitive. If the threshold is set to a big number then the imaging device may be stricter. In this way, users may select sensitivity or strictness in determining a scene change and may set the threshold accordingly.

For example, brightness or luma based scene changes detect a total intensity of the light for each frame. In some embodiments, luma values are normalized and represent a relative change in brightness between frames. A luma value can be measured for each frame, where the luma values are normalized, for example to 10 bits, such that a value of 0 represents total darkness (e.g., an absence of brightness) and 1024 (e.g., $2^{10}$) represents the highest possible brightness level. Thus, the luma value for each frame may fall within the range of 0 to 1024, and provide a normalized basis for comparing the intensity detected from each frame. In some embodiments, the luma value is detected for a given region of the frame. In other embodiments, the luma value is calculated across the whole frame. In some embodiments, the imaging device preview runs at 30 frames per second ("fps") in bright light conditions and 15 fps in low light conditions. The luma value for each frame may be calculated, in this example, across the entire display, the display being made of multiple pixels. At the start of monitor phase 110, the luma value of the first frame is calculated and represents a referential frame indicating a stable and unchanged scene. The luma values of subsequent preview frames are calculated, and the value for each subsequent frame is compared with the referential frame. If the absolute difference, either positive or negative, of the luma values between the subsequent frame and the referential frame is greater than the threshold, then the imaging device is configured to determine a scene change has occurred. For example, the threshold may be set to 100 luma, and at the start of monitor phase 110 the referential frame has a luma value is 200. If the luma value of a second frame is 202, then the imaging device is configured to determine that a scene change has not occurred. However, if the luma value of a subsequent frame is calculated to be 350, having a difference with the referential frame greater than the threshold 100, then the imaging device is configured to determine a scene change has occurred. While the preceding example included a threshold set to 100 luma, any threshold value may be selected based on the desired sensitivity of the scene change determination.

In another illustrative example, gyroscopes and accelerometers can be included in imaging devices. These elements are configured to detect changes in position, orientation, or movement of the imaging device. For example, in recent years vibration gyroscope sensors have been included into imaging devices as shake detection systems for compact video and still cameras, motion sensing for video games, and vehicle electronic stability control (anti-skid) systems, among other things. In some embodiments, these sensors return x, y, z coordinates of angular velocity. Similar to the luma value determination, a threshold is set, and where the difference of the square root of the coordinates of the angular velocity (e.g., $(x^2+y^2+z^2)$) between a given frame and the referential frame is greater than the threshold, then the imaging device determines that a change in scene has occurred.

Another illustrative example uses laser sensors to determine a change in scene has occurred. Laser sensors can return a physical distance for every frame. In some embodiments, the distance is measured on the magnitude of millimeters. In another embodiment, the distance is determined based on a time-of-flight calculation, e.g., the time difference between emitting light and detecting returned or reflected light. At the start of monitor phase 110, the distance between the imaging device and a scene of a referential frame is determined, and when the difference between the distances detected between a subsequent frame and the referential frame is greater than some threshold, a scene change is detected. For example, similar to the luma value and movement based determinations, a threshold can be set to 100 mm. At the first frame of monitor phase 110 the distance of the object may be determined to be 200 mm from the imaging device, and then at some subsequent frame the distance from the imaging device to the object is determined to be 600 mm. Thus, the difference in the distances of the referential and subsequent frame is greater than the threshold, and the imaging device is configured to determine that the scene has changed. While the preceding example included a threshold set to 100 mm, any threshold value may be selected based on the desired sensitivity of the scene change determination.

Once a scene change is detected, the imaging device may monitor the scene during the monitoring phase 110 to determine whether the scene is stable, e.g., that the scene is not continuously changing or the imaging device is not panning. Once the scene is not changing or the imaging device is no longer panning, then the scene is considered to be stable. Example methods for determining that the scene is stable include (i) luma value based stabilization determination and (ii) movement (e.g., gyroscope and/or accelerometer) based determination. For each approach, a condition is set and the imaging device is configured to monitor for the occurrence of the condition in a given number of successive frames. For example, when the imaging device determines that a predetermined number of successive frames are detected meeting the condition (e.g., the difference in value between successive frames is below a certain threshold indicating the scene is not changing) based on detected values the imaging device determines the scene is stable.

In an illustrative example, the imaging device may use brightness or luma values, as described above, to determine whether the scene is changing. Similar to luma value based scene change detection, a luma value is calculated for every frame. However, unlike the scene change detection, stability is based on the absolute difference of successive frames. For example, a stability threshold is set (e.g., 5 luma) and a number of frames having a difference below the threshold is set (e.g., set to 3). The stability threshold value and number of frames used herein are intended for illustrative purposes, and other stability threshold values and number of frames are possible based on the desired sensitivity of the stability determination. In an illustrative example, a first frame may have a value of 200 luma and a third frame may have a value of 350, thereby indicating a scene change where the scene change threshold is 100, as described above. Then subsequent frames may have luma values of 360, 370, 374, 375, and 375 for the fourth through eighth frames. In order for the scene to be determined as stable, the difference of successive frames is calculated, e.g., the fifth frame value (360 luma) minus the fourth frame value (350 luma) is determined, and here the difference is 10 luma which is greater than threshold 5 luma, thus the imaging device is configured to determine that the scene is not stable yet. Then the sixth frame value (370 luma) minus the fifth frame value (360 luma) is calculated to be 10 and again, thus the scene is not stable. Next, the seventh frame value (374 luma) minus the sixth frame value (370 luma) is calculated which is less than 5, indicating the scene is stable between the seventh and sixth frames. Next, the eighth frame value (375 luma) minus the seventh frame value (374 luma) is calculated to be less than 5, indicating a second instance of stability between the seventh and eighth frames. Last, the ninth frame value (375 luma) minus the eighth frame value (375 luma) is calculated to be less than 5, indicating an instance of stability between the ninth and eighth frames. Therefore, the imaging device has detected three stable frames. The imaging device can be configured to then determine the scene is stable, at which point the imaging device can be configured to proceed to the autofocus search phase 120.

In another illustrative example, the imaging device may utilize movement information to determine the stability of a scene, for example based on gyroscope measurements. Similar to gyroscope based scene change determination, the square root of the coordinates of the angular velocity (e.g., $(x^2+y^2+z^2)$) is calculated and compared to a threshold. However, unlike determining a scene has changed, successive frames are compared until a predetermined number of frames being below the threshold are detected, and then the imaging device may be configured to determine the scene is stable. For example, similar to the luma value based determination described above, a threshold is to 0.3 and number of frames to wait is set to 3. The imaging device determines the scene is stable or not shaking when the difference of value of square root of $(x^2+y^2+z^2)$ for successive frames is less than 0.3 for 3 consecutive frames.

Referring to FIG. 1, once a scene change 135 has been detected and the scene is considered to be stable at point 137, as determined during the monitoring phase 110, the autofocus search phase 120 may be performed (e.g., the imaging device moves the lens to find a focus position). During the autofocus search phase 120 the imaging device moves the lens to the optimal focus lens position, located at some position between point 145 (start of autofocus) and 150 (end of autofocus).

Figure 2A:
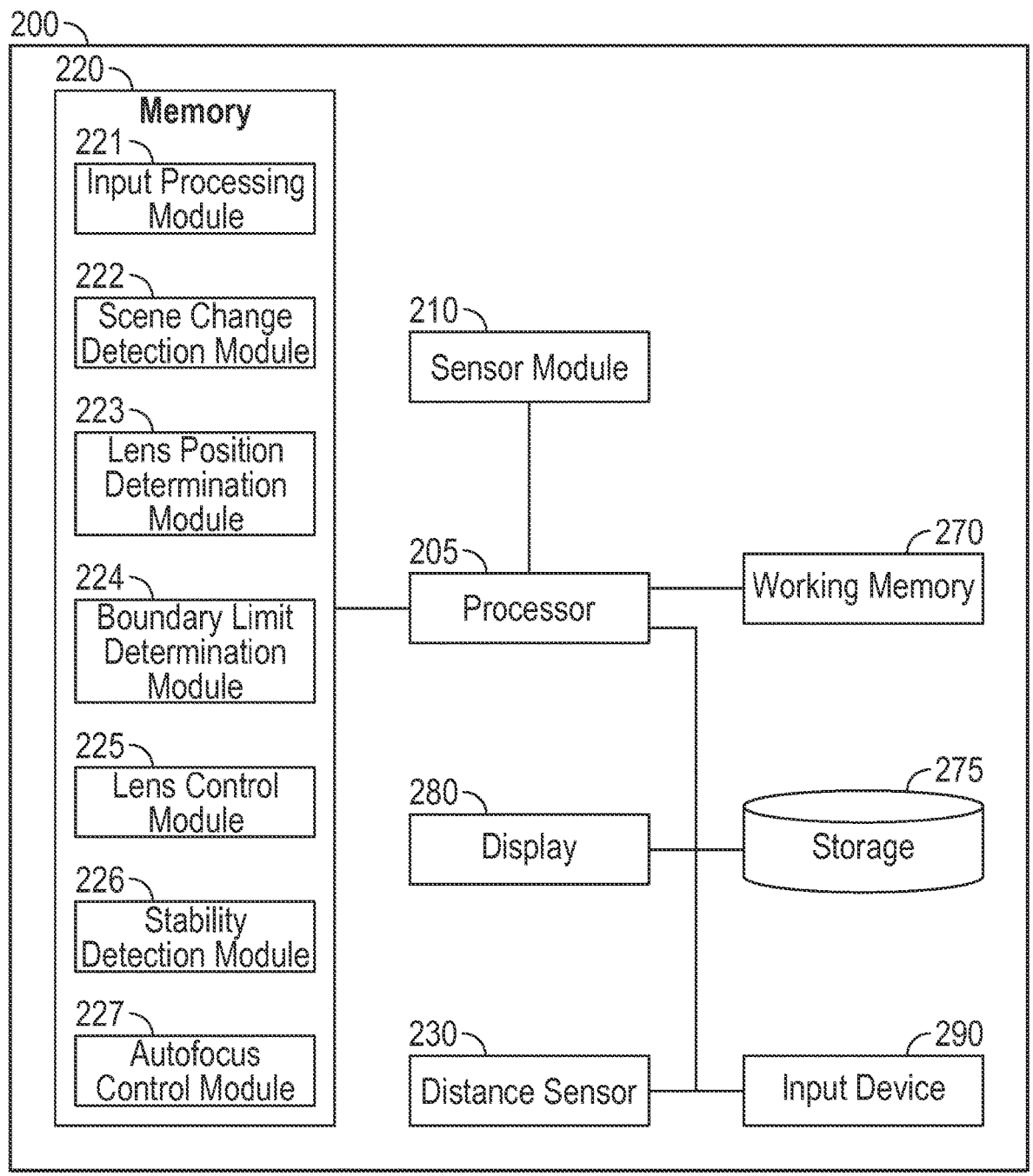
FIG. 2A is a block diagram illustrating an example of an embodiment of an imaging device.
Figure 2B:
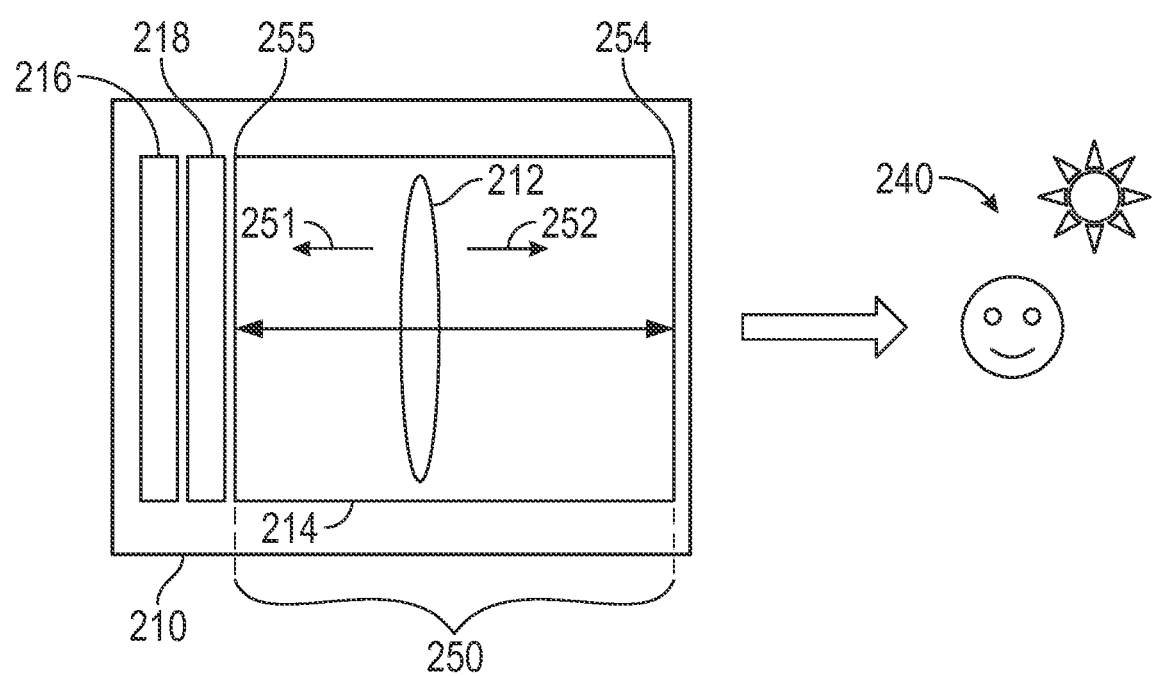
FIG. 2B is a block diagram illustrating an example of an embodiment of a sensor module of the imaging device of FIG. 2A.

FIG. 2A illustrates a block diagram illustrating an example of an embodiment of an imaging device 200 having a sensor module 210. FIG. 2B illustrates an embodiment of sensor module 210. The illustrated imaging device 200 includes a processor 205 operatively connected to a sensor module 210, working memory 270, storage 275, display 280, distance sensor 230, and an input device 290. Processor 205 is also connected to a memory 220. The memory 220 stores several modules that store data values defining instructions to configure processor 205 to perform functions of imaging device 200, as will be described in more detail below.

In addition, as illustrated in FIG. 2B, the sensor module 210 may include a lens 212, an autofocus component 214, and an image sensor 216. Light enters the lens 212 from scene 240 and is focused on the imaging sensor 216. In one aspect, the imaging sensor 216 utilizes a charge coupled device. In another aspect, the imaging sensor 216 utilizes either a CMOS or CCD sensor. The lens 212 is coupled to the autofocus component 214, and is moved by an actuator (not shown) of autofocus component 214. The actuator is configured to move the lens 212 in a series of one or more lens positions through a moveable range 250. In the embodiment shown in FIG. 2B, the lens can be moved along the movable range 250 in a direction 251 toward the infinity mechanical end 255 and in a direction 252 toward the macro mechanical end 254, and the position of the lens along the moveable range 250 will be described herein as the "lens position." In some embodiments, the lens positions of the moveable range 250 are discrete positions that the lens may be moved to by the actuator. The autofocus component 214 may include any method known in the art for actuating the lens 212 including a voice coil motor (VCM), Micro-Electronic Mechanical System (MEMS), or a shape memory alloy (SMA). The embodiment of FIG. 2B includes mounting space 218 of the sensor module 210 which may be a cavity at least partially between the lens 212 and the image sensor 216. The mounting space 218 is a region in the sensor module 210 for mounting mechanics. For example, in some embodiments, mounting space 218 may hold brackets and other support for mounting the autofocus component. Mounting space 218 may provide area for brackets and other mounting means for mounting image sensor 216. Accordingly, the mounting space 218 may include one or more components to increase structural integrity of the autofocus component 214, lens 212 and image sensor 216 and be dimensioned (or configured) to allow an image to focus on image sensor 216 and maintain alignment along the optical axis of lens 212.

Returning to FIG. 2A, the working memory 270 may be utilized by the processor 205 to store data dynamically created during operation of the imaging device 200. For example, instructions from any of the modules stored in the memory 220 (discussed below) may be stored in working memory 270 when executed by the processor 205. The working memory 270 may also store dynamic run time data, such as stack or heap data utilized by programs executing on processor 205. The storage 275 may be utilized to store data created by imaging device 200. For example, images captured via lens 212 may be stored on storage 275. The display 280 is configured to display images captured via lens 212 and may also be utilized to implement configuration functions of device 200.

The display 280 illustrated in the embodiment of FIG. 2A is configured to display images and frames captured via lens 212 and may also be utilized to implement configuration functions of device 200. In one implementation, display 280 can be configured to display one or more objects selected by a user, via an input device 290, of the imaging device.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290.

The distance sensor 230 illustrated in the embodiment of FIG. 2A is configured to determine the distance between the imaging device 200 and the object 240 being focused upon. In one embodiment, the distance sensor 230 is a laser module or laser sensor. In one embodiment, the distance is based on a time-of-flight calculation, where the laser sensor, via an infra-red emitter, sends pulses of light toward the scene 240, and an ultra-fast light detector picks up the reflected pulses. The laser module may then accurately measure the time difference between the emission of a pulse and the detection of the reflection. Based on the measured time and the known speed of light, the distance between the object 240 and the imaging device 200 may be determined. In another embodiment, the distance sensor 230 may be a dual camera system. One implementation of a dual camera system may be similar to human eyes positioned side by side. Such a dual camera system can capture a left image and right image and to apply triangulation techniques to determine the distance of an object 240 in the captured images. Dual camera systems can be configured to estimate the distance of the object 240 in front of the imaging device 200 as a result of the separate cameras, where the separate images are of the same scene. The imaging device 200 can then calculate the distance to the object 240 based on these two images. In some embodiments, the distance sensor 230 can be configured to determine a distance between the imaging device 200 and any one object 240 of a single frame. In one embodiment, the distance sensor 230 may send the detected distance between the imaging device 200 and the object 230 to the memory 220 discussed below. In another embodiment, the distance sensor 230 may send the detected distance to the working memory 270 and/or storage 275. Therefore, the distance sensor 230 may be one means for detecting and determining a distance between an object 240 and the imaging device 200 for one image frame and/or multiple frames.

Figure 5:
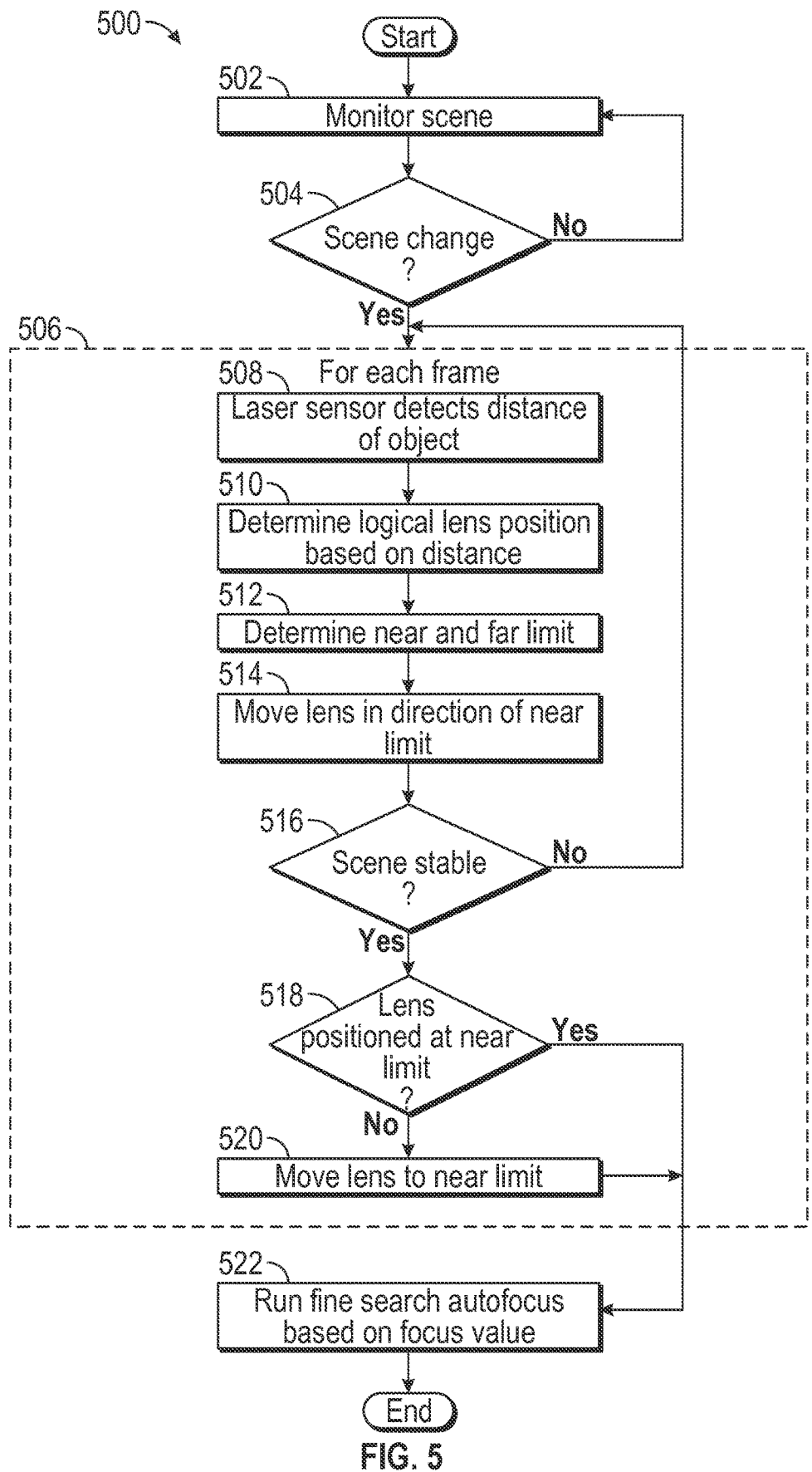
FIG. 5 is a flowchart illustrating an example of a process of determining the direction of an optimal focus lens position.

The memory 220 may be considered a computer-readable media and can store one or more modules. The modules store data values defining instructions for processor 205. These instructions configure the processor 205 to perform functions of device 200. For example, in some aspects, memory 220 may be configured to store instructions that cause the processor 205 to perform method 500, or portions thereof, as described below and as illustrated in FIG. 5. In the illustrated embodiment, the memory 220 includes an input processing module 221, a scene change detection module 222, a lens position determination module 223, a boundary limit determination module 224, a lens control module 225, a stability detection module 226, and an autofocus control module 227.

The input processing module 221 includes instructions that configure the processor 205 to read input data from the input device 290. In one aspect, input processing module 221 may configure the processor 205 to detect objects 240, or portions thereof, within an image frame captured by the image sensor 212. In another aspect, input processing module 221 may configure processor 205 to receive a user input from input device 290 and identify a user selection or configuration based on the user manipulation of input device 290. Therefore, instructions in the input processing module 221 may represent one means for identifying or selecting one or more objects 240 within an image frame. In some embodiments, the input processing module 221 may configure the processor 205 to send data representing the selected object or portion of an image frame to the working memory 270 for use and access by the other modules of memory 220.

Still referring to FIG. 2, instructions in the scene change detection module 222 may configure the processor 205 to detect a scene change based, at least in part, on selected object or portion of a scene received from the input data from input processing module 221. In some embodiments, instructions in the scene change detection module 222 may configure the processor 205 to detect a scene change based on information obtained by the monitored scene, for example light intensity measurements, gyroscopic measurements related to the physical movement of the imaging device, and/or distance measurements received from the distance sensor 230. Therefore, instructions in the scene change detection module 222 may represent one means for detecting a change in the scene based, at least in part, on the selected object or portion of an image frame. In some embodiments, instructions in the scene change detection module 222 may send information indicative of a scene change to the lens position determination module 223 and/or the lens control module 225. Therefore, instructions in the scene change detection module 222 may represent one means for indicating the scene has changed. Instructions in the lens control module 225 and/or the lens position determination module 223 may represent one means for receiving information indicating that the scene has changed and/or is continuously changing.

Instructions in the lens position determination module 223 may configure the processor 205 to determine a lens position for each frame based, at least in part, on the distance between object 240 and the imaging device 200 detected by the distance sensor 230. In some embodiments, instructions in the lens position determination module 223 may configure the processor 205 to receive a distance measurement from the distance sensor 230. In addition, instructions in the lens position determination module 223 may configure the processor 205 to retrieve calibration inputs from working memory 270 and/or storage 275, such as design specifications of sensor module 210 and anchor values, as will be described below in reference to Equations 1-3. In some embodiments, the instructions in lens position determination module 223 may configure the processor 205 to convert a distance measurement from the distance sensor 230 to an estimated lens position for optimal focus based, at least in part, on the design specifications of sensor module 210 and the anchor values, as detailed below with reference to Equations 1-3. Therefore, the instructions in lens position determination module 223 may represent one means for determining an estimated lens position for optimal focus of the lens 212 in sensor module 210 from a distance measurement received from the distance sensor 230. In some embodiments, the instructions in lens position determination module 223 may configure the processor 205 to convert a distance measurement from the distance sensor 230 to a lens position while the scene continues to change as determined by the instructions in the scene change determination module 222. Therefore, the lens position determination module 223 may represent one means of receiving information indicative of a change in the scene. In some embodiments, instructions in the lens position determination module 223 may send an estimated lens position for optimal focus to the boundary limit determination module 224 and/or the lens control module 225. Therefore, instructions in the lens position determination module 223 may represent one means for generating input parameters defining an estimated lens position for optimal focus based, at least in part, on a detected distance between an object 240 and the imaging device 200. Further, instructions in the boundary limit determination module 224 and/or the lens control module 225 may represent one means for receiving input parameters defining an estimated lens position for optimal focus.

Instructions in the boundary limit determination module 224 may configure the processor 205 to determine boundary limits based, at least in part, on the estimated lens position for optimal focus determined by the processor 205 based on instructions from lens position determination module 223. In some embodiments, the instructions in the boundary limit determination module 224 may configure the processor 205 to receive an estimated lens position for optimal focus for each image frame, while the scene is continuously changes, and determine a near and a far boundary limit encompassing the estimated lens position for optimal focus. Therefore, the boundary limit determination module 224 may represent one means for determining multiple boundary limits about the estimated lens position for optimal focus. In some embodiments, the instructions in the boundary limit determination module 224 may configure the processor 205 to send the boundary inputs defining the near and far boundary limits to the lens control module 225. Therefore, instructions in the boundary limit determination module 224 may represent one means for generating boundary inputs based, at least in part, on the estimated lens position for optimal focus. Further, instructions in the lens control module 225 may represent one for receiving input parameters, including at least boundary limits.

Instructions in the lens control module 225 may configure the processor 205 to effect a lens position for lens 212 based, at least in part, on the estimated lens position for optimal focus determined by the lens position determination module 223. In some embodiments, instructions in the lens control module 225 may configure the processor 205 to move the lens 212 in a direction toward the estimated lens position for optimal focus received from the lens position determination module 223. In one embodiment, the lens 212 is moved up to the boundary limits received from the boundary limit determination module 224. Therefore, the lens control module 225 may represent one means for moving the lens 212 based on input parameters received from one or more modules of memory 220. In some embodiments, the instructions in the lens control module 225 may configure the processor 205 to move the lens 212 based on the received input parameters while the scene remains unstable and continues to change. Therefore, instructions in the lens control module 225 may represent one means of receiving information indicative of a scene change. In some embodiments, the instructions in the lens control module 225 may configure the processor 205 to move the lens only to a near boundary limit while the scene changes.

Instructions in the stability determination module 226 may configure the processor 205 to determine whether scene is stable based, at least in part, on the object 240 or portion of scene. In some embodiments, instructions in the stability determination module 226 may configure the processor 205 to determine if the scene is stable based, at least in part, on information obtained from the monitored scene, for example light intensity measurements, gyroscopic measurements related to the physical movement of the imaging device, and/or distance measurements received from the distance sensor 230. Therefore, instructions in the stability determination module 226 may represent one means for determining the scene is stable based, at least in part, on the selected object or portion of an image frame and inputs received from the one or more modules of memory 220. In some embodiments, instructions in the stability determination module 226 may send information indicative that the scene is stable to the lens position determination module 223, the lens control module 225, and/or the autofocus control module 227. Therefore, instructions in the stability determination module 226 may represent one means for indicating scene is stable. Instructions in the lens position determination module 223, the lens control module 225, and/or the autofocus control module 227 may represent one means for receiving information indicating the scene is stable.

In some embodiments, once the scene is determined to be stable by the processor 205 configured by instructions in stability determination module 226, instructions in the lens control module 225 may configure the processor 205 to stop moving the lens 212 based on received inputs. Further, instructions in the lens position determination module 223 may also configure the processor 205 to stop determining an estimated lens position for optimal focus based on a detected distance from distance sensor 230. Further still, in some embodiments, instructions in the autofocus control module 227 may configure the processor to initiate an autofocus search operation based, at least in part, on the determination that the scene is stable. Therefore, the autofocus control module 227 may represent one means of performing an autofocus search. In some embodiments, instructions in the autofocus control module 226 may configure the processor 205 to initiate an autofocus search based, at least in part, on inputs received from the lens control module 225. For example, an autofocus search operation may be initiated when the lens 212 is positioned at the near limit, as described in detail herein, and when the scene is determined to be stable. In some embodiments, instructions in the autofocus control module 227 may send autofocus search parameters, such as step size, for performing the autofocus search operation to the lens control module 225. Instructions in the lens control module 225 may configure the processor 205 to effect an autofocus search by moving the lens 212 based on the autofocus search parameters. Therefore, the lens control module 225 may represent another means for performing an autofocus search operation.

Figure 3:
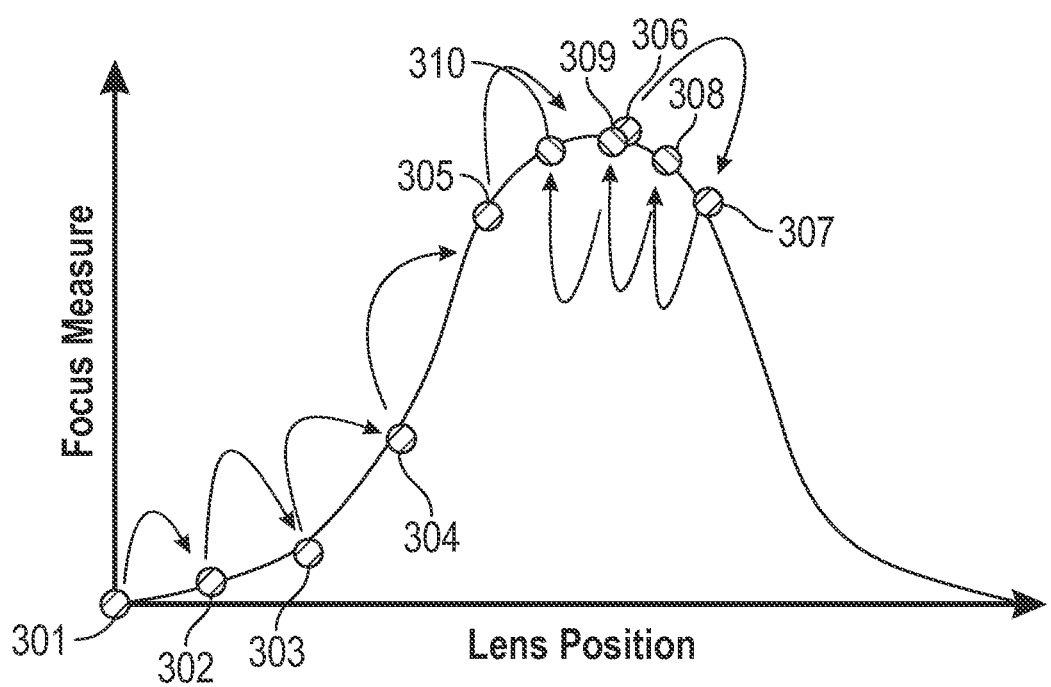
FIG. 3 is a graph illustrating an example of the focus value autofocus method plotted against the lens position for a given scene and sensor module.

FIG. 3 is a graph illustrating an example of a focus value autofocus method (y-axis) plotted against the lens position (x-axis) for a given scene and sensor module, for example, the sensor module 210 shown in FIG. 2B. Each dot 301-310 illustrates a lens position of a lens, such as lens 212 being moved by the autofocus component 214. At each lens position, the processor 205 may be configured to determine a focus value, and the lens position where the imaging device detects the highest focus value is the lens position for optimal focus. For illustrative purposes, the moveable range 250 can be set from 0 to 100, where a lens position of 0 represents the lens is positioned at the macro mechanical end 254 (e.g., the imaging device is focusing on close objects) and a lens position of 100 represents the infinity mechanical end 255 (e.g., the imaging device is focusing on far objects). In some embodiments, each integer from 0 to 100 may represent a single discrete lens position. Thus, as a lens is moved along the moveable range 250 (FIG. 2B), the imaging device calculates the highest focus value which represents the lens position for optimal focus. Then as the lens is moved off of the optimal focus lens position, the focus values will decrease, providing the curve illustrated in FIG. 3.

In some imaging devices, once the imaging device determines the scene is stable and initiates the autofocus search phase, the imaging device performs an autofocus search by moving the lens through lens positions along the moveable range 250 from lens position 0 to lens position 100. The autofocus search may begin at one end of the moveable range (e.g., macro mechanical end 254) and perform large coarse steps 301-307. For each step 301-307 the imaging device may calculate the focus value thereby providing a general shape similar to that of FIG. 3. In this way, the imaging device is able to estimate where the peak focus value is. Once the focus value for each step decreases relative to the previous step, the imaging device may be configured to perform smaller steps 308-310 around the peak to locate the optimal focus lens position. However, some autofocus searches require doubling back over previously traversed regions of the moveable range, as illustrated in the fine search of FIG. 3, as the imaging device makes multiple passes at increasingly smaller or finer step sizes.

Figure 4:
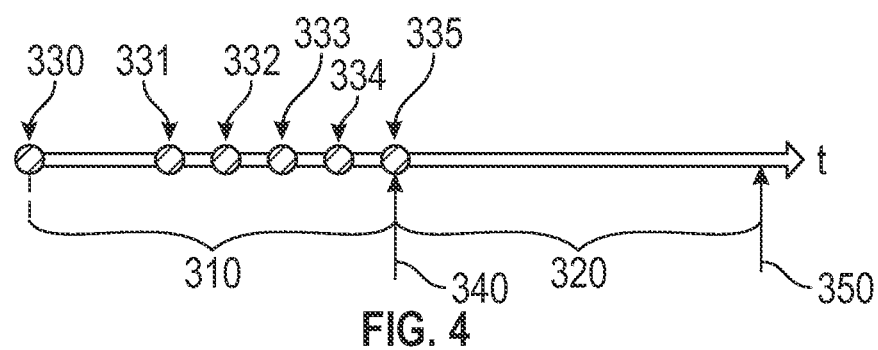
FIG. 4 illustrates an autofocus event timeline for an exemplary autofocus event in accordance with one embodiment.

FIG. 4 illustrates an autofocus event timeline for an exemplary autofocus event in accordance with one embodiment. In FIG. 4, the timeline is plotted along an axis that represents the passage of time (t). In some embodiments, the autofocus event occurs entirely in continuous autofocus mode, including the monitor phase 310 and the search phase 320. As shown in FIG. 4, a scene change 331 is detected during the monitor phase 310 having a monitor phase start at point 330. The scene change may be detected by various methods, as described above in reference to FIG. 1. Once a scene change is detected, the distance sensor 230 reports the distance between the at least one object of the scene and the imaging device 200 for every frame 332-335. In some embodiments, the distance sensor 230 is a laser module that may report the distance on the order of millimeters. In one embodiment, the distance is based on a time-of-flight calculation, where the laser sensor, via an infra-red emitter, sends pulses of light toward the scene, and an ultra-fast light detector picks up the reflected pulses. The laser module may then accurately measure the time difference between the emission of a pulse and the detection of the reflection. Based on the measured time and the known speed of light, the distance between the object and the imaging device 200 may be determined. In another embodiment, the distance sensor 230 may be a dual camera system configured to provide a physical distance in a method similar to the laser module. One implementation of a dual camera system may be similar to human eyes positioned side by side. Such a dual camera system can capture a left image and right image and to apply triangulation techniques to determine the distance of an object in the captured images. In general, dual camera systems can be configured to estimate the distance of the object in front of the imaging device 200 as a result of the separate cameras, where the separate images are of the same scene. The imaging device 200 can then calculate the distance to the scene based on these two images.

Still referring to FIG. 4, in some embodiments disclosed herein, the imaging device 200 calculates the lens position of each frame 332-335 based on the reported distance of that frame received from the distance sensor. In some embodiments, the lens position is an estimate of the actual lens position, because the actual determination may be affected by external influences from the surrounding environment. Based on the determined lens position of the reported distance for each frame, a boundary range on either side of the lens position is set, for example a near and far boundary limit 340 and 350, respectively. The near boundary limit will be understood to refer to the boundary closest to the current lens position of the lens, such that the boundary is physically located between the current lens position and the optimal focus lens position. Far boundary limit will be understood to refer to the boundary furthest from the current lens position of the lens, such that the optimal focus lens position is located between the far boundary limit and the current lens position. Following the estimation of the optimal focus lens position and the near and far limit boundaries, the imaging device 200 can be configured to determine a direction to move the lens 212. The lens 212 is moved in the direction of the determined optimal focus lens position, while the distance sensor 230 continuously detects the change in the scene for every frame until the current lens position of the lens 212 is the near boundary limit and/or the scene is stable. In some embodiments, when the near limit is reached and/or the scene is stable, the imaging device 200 may be configured to initiate an autofocus search operation within the near limit and far limit. In some embodiments, the autofocus search operation may include fine lens steps such that a fine autofocus search operation is performed. Fine lens steps may refer to a lens step that is smaller in magnitude than a coarse lens step, for example, the lens steps illustrated as smaller steps 308-310 of FIG. 3 may represent fine lens steps as compared to coarse lens steps illustrated as coarse steps 301-307 of FIG. 3. In some embodiments, the fine lens steps may be a fraction of the larger coarse lens steps.

For example, the movable range of the lens can be set from 0 to 100 lens positions, and, prior to the method disclosed herein, the imaging device may be calibrated by determining a lens position for an object 50 cm away. To do this, an object may be placed 50 cm away from an imaging device 200 and the imaging device records the lens position for the best focus based on a calibration or tuning process. For example, the optimal focus lens position for an object 50 cm away may be determined to be a lens position of 60, which is an integer representing the position of the lens 212 along the moveable range of the sensor module 210. This represents an anchor lens distance of 50 cm and an anchor lens position of 60. The anchor lens distance and lens position can be used to calculate lens positions for other distances, the other distances being detected by the laser module during the monitor phase of an autofocus event. The imaging device 200 may be configured to convert a detected physical distance into a lens position based on the anchor distance, anchor lens position, and sensor module specifications (e.g., focal length of the lens, F number, pixel size of the image sensor, and sensitivity of the imaging device).

Accordingly, a lens position may be calculated as follows where the distance sensor 230 reports the object is 20 cm away from the imaging device 200:

$$PLL=PAL-(\text{abs}(X1-X0)/S) \qquad \text{Eq. (1)}$$

where PLL is the lens position, PAL is the anchor lens position, S is the sensitivity derived from the specification of the imaging device, and X1 and X0 are determined by the following equations:

$$X_1=(f^2/(X_D-f))*1000; \qquad \text{Eq. (2)}$$

$$X_0=(f^2/(D_A-P))*1000; \qquad \text{Eq. (3)}$$

where f is the focal length of the lens of the imaging device, $X_D$ is the distance reported by the distance sensor, and $D_A$ is the anchor distance. Therefore, where the predetermined anchor distance is 500 mm, anchor lens position is 60, the sensitivity is 1, and the focal length is 3.83, the lens position for an object located 200 mm away from the imaging device is approximately 14. This indicates, that in order for the imaging device to focus on an object located 20 cm away, the lens should be positioned somewhere around lens position 14 along the moveable range. The lens position of 14 is a calculated estimate, however in the real world the optimal focus lens position would be between approximately lens position 10 and 20. This is because the lens will experience variations and influence from gravity, heat, friction, and other external influences. Therefore, to compensate for the deviations, the method may perform a fine autofocus search between the lens positions of 10 and 20, which represent a near and far boundary limit depending on where the lens is currently located along the moveable range.

In some embodiments, the range of lens positions where the actual optimal focus lens position is likely to be located can be determined based on the depth of field ("DOF") of the imaging device. In photography, DOF is the distance between the nearest and farthest objects of a scene that are acceptably sharp or focused. For each distance of the object, there is a corresponding DOF. Thus, in some embodiments, the optimal focus lens position can be anywhere within the range of the DOF for the object distance determined for a given image frame.

In some embodiments disclosed herein, once the scene change has been detected, the lens is moved toward the near limit even though the device may still be panning or not stable, unlike in traditional autofocus search methods. This is because the imaging device is capable of determining in which direction to move the lens as a result of estimating a target lens position based on the physical distance returned by the distance sensor for every frame (following a scene change). In this way, the imaging device knows the direction to move the lens and by what amount to move the lens. In contrast, traditional contrast autofocus search operations do not know the direction or amount to move a lens when the scene has changed, the imaging device is forced to wait until the scene is stable during the monitor phase, and then based on the comparison of the contrast attempt to focus the scene.

For example and as described above, the movable range of lens may be set from 0 to 100, where each integer (e.g., 0, 1, etc.) represents a lens position, and the lens may be currently positioned at 100. First, the imaging device determines the scene has changed (e.g., based on luma, movement, or distance as described above) and the distance sensor detects and transmits a new distance for a given frame. For example, the distance sensor determines, for a given frame, the object is located 50 cm from the imaging device. The imaging device, or a module of the memory 220 included therein, then determines the lens position as 60, based on the Equations (1)-(3), where 60 is an estimation of the lens position which represents that the optimal focus lens position may be around 60. It may be 60 exactly or somewhere near 60. Thus, to make sure the actual optimal focus lens position is located, the imaging device may run a fine autofocus search with the near and far boundary limits. The near and far limits are set as, for example, 80 and 40, respectively. While the imaging device is still panning and/or is not stable (e.g., the imaging device is currently in the monitor phase), the lens is moved toward the near boundary limit of 80, and when the scene is about to be stable the lens should be located at about the near boundary limit. In the illustrative example, the current position is 100, and while in the monitor phase (e.g., the imaging device is currently panning or not stable) the lens is moved by steps of 10 for each frame (where the focus position is estimated as stated above and the near boundary limit is set in turn). Hence, at the next frame the lens will be at 90 and then 80. When the lens is at 80 it will have reached the near boundary limit, and, in some embodiments, the imaging device may perform a fine autofocus search. In some embodiments, the autofocus search phase may be initiated based on the lens reaching the near boundary limit. In another embodiment, the autofocus search phase may be initiated based on the imaging device determining the scene is stable and/or the imaging device has stopped panning. In some instances, the imaging device may become stable while the lens is off of the near boundary limit, and in these instances the lens may be moved directly to the near boundary limit prior to initiating the autofocus search phase.

An illustrative non-limiting advantage of the embodiments disclosed herein includes since the lens is moved while the imaging device is panning, the occurrence of defocus events is reduced because the lens is already closer to the optimum focus lens position prior to starting the autofocus search phase. The user would be less likely to see a defocusing event in the preview screen of an imaging device. Therefore, embodiments disclosed herein would decrease defocus events significantly since the lens is moved earlier and more accurately then traditional autofocus search operations.

FIG. 5 is a flowchart of a process of determining the direction of an optimal focus lens position at the outset or prior to an autofocus search operation of an imaging device. Process 500 may be performed by imaging device 200, illustrated in FIGS. 2A and 2B. In some embodiments, the method of determining the direction of a lens position for optimal focus can be implemented as a software solution by the memory 220, or any combination of modules of memory 220, or implemented elsewhere in the imaging device 200, for example one or more processors executed by a logic device in processor 205.

Process 500 begins at a start block and then moves to block 502, where the imaging device monitors the scene. In one embodiment, block 502 initiates the monitor phase of the imaging device. In some embodiments, the imaging device captures and/or previews multiple image frames of a scene on the display of the imaging device. In some embodiments, the imaging device automatically selects an object of interest that will be monitored.

As part of the monitoring phase, the process 500 moves to decision block 504, where process 500 determines whether a scene change has occurred. In this regard, the imaging device may utilize any method of detecting a scene change. Example methods, as described above, include luma value, movement, and distance based scene change detection. If the imaging device determines that the scene has not changed, then the process returns to block 502 and continuously monitors the scene until a scene change is detected. If a scene change is detected, the process moves to subprocess 506 for each frame following the detection of a scene change.

For each frame, the process 500 moves to block 508, where the distance sensor detects a distance between the object and the imaging device. In some embodiments, the distance sensor is a laser module or laser sensor configured to detect a distance based on emitted light (e.g., a time-of-flight calculation). In another embodiment, the distance sensor is a dual camera system configured to determine the distance between the imaging device and the object. The distance sensor may be configured to report or send the detected distance to memory 220 for evaluation and processing.

After the distance is determined in block 508, the process 500 moves to block 510, where the lens position is determined based on the distance detected in block 508. The lens position may be calculated in accordance with the above description in reference to Equations (1)-(3).

After the lens position is determined for the given frame, process 500 moves to block 512, where the near and far boundary limits are set. In one embodiment, the near and far boundary limits are set based on the determined lens position. In other embodiment, the near boundary limit is set to be physically located along the moveable range between the current lens position and the lens position for optimal focus. In another embodiment, the far boundary limit is set to physically located long the moveable range, where the optimal focus lens position is located between the far boundary limit and the current lens position.

After the near and far boundary limits are set, process 500 moves to block 514, where the lens is moved in the direction toward the near boundary limit. In some embodiments, the imaging device, the autofocus component 214 of FIG. 2B, and/or a module of memory 220 may operate individually or conjointly to move the lens toward the near boundary limit. In some embodiments, the lens is moved by a predetermined discrete step size for each frame, e.g., 10 lens positions towards the near boundary limit for the given frame. In another embodiment, the lens is moved along the moveable range in a continuous motion until the analysis for the next frame is initiated, until the scene is stable, and/or until the lens is located at the near boundary limit. In one embodiment, the selection of the number of lens positions for each step size can be part of a tuning or calibration procedure. Users or manufacturers can set the value as s per their preference, e.g., 10 lens positions or 11 lens positions. There may not be a definite number of lens positions that a step size must be. However, certain embodiments may include certain default values. Considerations when selecting the step size may include, at least, accuracy of the location of the lens position for optimal focus and the amount time needed for the autofocus search. For example, setting a smaller step size may return accurate optimal focus lens positions but at the cost of increasing the autofocus search time. Alternatively, setting a larger number of lens positions as the step size may decrease the search time at the cost of accuracy.

After the lens is moved toward the near boundary limit, process 500 moves to decision block 516, where a determination is made as to whether the scene is stable. Example methods, described above, include luma value and movement based stability determination. If the imaging device determines that the scene is not stable, then the process returns to the start of subprocess 506 and repeats the process for the next frame.

If the scene is determined to be stable, the process 500 moves to decision block 518, where a determination is made as to whether the lens is positioned at the near boundary limit. In some embodiments, when the scene is determined to be stable the lens should be positioned at or close to the near boundary limit. In these instances, decision block 518 determines the lens is positioned at the near boundary limit and proceeds to block 522. However, in some instances the lens is not located at the near boundary limit when the scene is stable. In these instances, decision block 518 determines the lens is off of the near boundary limit and then proceeds to block 520. At block 520 then lens is moved to the near boundary limit.

Either after a determination that the lens is at the near boundary limit or that the lens was moved to the near boundary limit at block 520, the process 500 may move to block 522. Block 522 may represent the end of the monitoring phase, where the scene is stable and the imaging device is no longer panning. Thus, block 522 may also represent the initiation of the autofocus search phase. At block 522, the process 500 may perform a fine autofocus search operation based on the focus value for each step, as described above in reference to FIG. 3. In this way, the process 500 may enable the imaging device to quickly and accurately locate the optimal focus lens position.

The following description includes numerous exemplary variations of the methods and apparatus disclosed herein. The exemplary variations are intended for illustrative purposes of embodiments disclosed herein and are not intended to be limiting in any way. In the following illustrative examples, the moveable range of the lens may be set from 0 to 100, where 0 is the macro mechanical end and 100 is infinity mechanical end. First, the imaging device detects a scene change, and the distance sensor detects new distance for a given frame, for example 50 cm. The imaging device then determines the lens position to be 60 based on the detected object distance of the given frame, where 60 is an estimation of the lens position which represents that the optimal focus lens position may be around 60. It may be 60 exactly or somewhere near 60. Thus, to make sure the actual optimal focus lens position is located, the imaging device may be configured to run a fine autofocus search around lens position 60.

In one illustrative example, the current lens position may be at 10. In this instance, the current lens position is in the macro mechanical region, meaning that the lens is located between the macro mechanical end and the optimal focus lens position. Since, the imaging device has determined that the optimal focus lens position is somewhere near lens position 60, the near and far boundary limits may be set at, for example, 40 and 80, respectively. Even though the device may be panning, the imaging device starts to move the lens towards the near boundary limit (e.g., 40 in this instance) in step sizes of 10 lens positions along the moveable range. Thus, for the next frame the lens is located at lens position 20, then 30 for the following frame, and finally 40 for the following frame. When the lens is at lens position 40, the scene may also be stable. When the scene is stable, the imaging device may then initiate the autofocus phase and commence a fine autofocus search in the range of the near and far boundary limits (e.g., lens positions 40 and 80) to locate the optimal focus lens position.

In another illustrative example, the current lens position may be at 100. Similar to the preceding example, the object may be located 50 cm from the imaging device and the estimated optimal focus lens position is around lens position 60. In this instance, the near and far boundary limit is lens position 80 and 40. It should be noted that in this instance the near boundary limit is lens position 80 not 40. This is because the current lens position is at 100 in the infinity mechanical region, thus the boundary limit nearest to the current lens position is lens position 80 and not 40. The imaging device determines that the optimal focus lens position is somewhere around lens position 60 and move towards 60. Therefore, the imaging device starts to move the lens towards the near boundary limit (e.g., lens position 80) in the steps of 10. Thus, for next frame the lens will be at lens position 90, and then lens position 80, and then the imaging device may determine the scene is stable. Once the scene is determined to be stable, then the imaging device may initiate the autofocus phase and commence a fine autofocus search in the range of the near and far boundary limits (e.g., lens positions 80 and 40) to locate the optimal focus lens position.

In another illustrative example, the scene is determined to be stable but the lens is not at the near limit. In this instance, the current lens position may be at lens position 10. As in the previous illustrations, the object may be located 50 cm from the imaging device, thus the optimal focus lens position should be around lens position 60. Since the current lens position is in the macro mechanical region and the optimal focus lens position is around 60, the imaging device sets the near and far boundary limits to lens positions 40 and 80, respectively. The imaging device then moves the lens towards the near boundary limit (e.g., lens position 40) by increments of 10 lens positions. For example, the imaging device moves the lens to lens position 20 in the next frame. Now, for illustrative purposes, at this frame the imaging device determines the scene is stable, but the lens is currently at lens position 20, which is not the near boundary limit (e.g., lens position 40). However, the imaging device would commence a fine autofocus search starting from the near boundary limit of lens position 40. In this instance, before commencing a fine autofocus search operation, the imaging device checks the current lens position to determine if the lens is at the near boundary limit or not. If the lens is not currently at the near boundary limit, then the imaging device moves the lens to the near boundary limit and commences a fine autofocus search. In the illustrative case herein, the imaging device determined the scene was stable when the lens was positioned at lens position 20, since the lens is not at the near boundary limit the imaging device moves the lens to the near boundary limit (e.g., lens position 40) and starts the fine autofocus search.

Alternatively, where the scene is not stable but the lens is positioned at the near boundary limit, and then the imaging device is configured to continue to monitor the scene until the imaging device determines the scene is stable. Once the scene is stable, the imaging device may commence a fine autofocus search. In some embodiments, the imaging device waits until it determines the scene is stable while the lens is positioned at the near boundary limit. In other embodiments, the imaging device continues to monitor the stability of the scene and, for each frame, re-estimate the optimal focus lens position for each frame. Thus, the imaging device will continue to determine the near boundary limit for each frame while it continues to monitor the stability of the scene.

In another illustrative example, the current lens position may be located between the near and far boundary limits when the imaging device determines the scene is stable. In this instance, upon determining the scene is stable, the imaging device may be configured to move the lens to the near boundary limit and then proceed with a fine autofocus search. For example, the imaging device may determine that the optimal focus lens position is around lens position 60, thus the near and far boundary limits are 40 and 80, depending on where the lens is currently positioned.

In a first example, the current lens position when the scene is stable is lens position 45, thus the lens is located within the near and far boundary limits. In this instance, the near boundary limit is set to lens position 40 and the far boundary limit is set to lens position 80. Therefore, when the imaging device determines the scene is stable, the imaging device may be configured to move the lens to the near position (e.g., lens position 40), and then commence a fine autofocus search from lens position 40 (near boundary limit) to lens position 80 (far boundary limit).

In a second example, the current lens position when the scene is stable is lens position 70, thus the lens is located within the near and far boundary limits. In this instance, the near boundary limit is set to lens position 80 and the far boundary limit is set to lens position 40. Therefore, when the imaging device determines the scene is stable, the imaging device may be configured to move the lens to the near position (e.g., lens position 80), and then commence a fine autofocus search from lens position 80 (near boundary limit) to lens position 40 (far boundary limit).

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments. A person of ordinary skill in the art will appreciate that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the embodiments described herein. Various modifications to these implementations will be readily apparent to those skilled in the art, and the generic principles defined herein may be applied to other implementations without departing from the spirit or scope of the embodiments. Accordingly, the disclosed embodiments are not intended to be limited to the implementations shown herein but instead are to be accorded the widest scope consistent with the principles and novel features disclosed herein.

The invention claimed is:

1. A method for reducing defocus events occurring during autofocus search operation, the method comprising:
   prior to initiating an autofocus search operation, detecting, using a processor, a change in a scene is occurring, and while the scene is changing:
      capturing, with an imaging device, a plurality of frames depicting the scene, a portion of the scene corresponding to an object;
      for each of the plurality of frames:
         determining, using a distance sensor, a distance between the object and the imaging device;
         determining a lens position for the frame based on the determined distance by converting the determined distance for each frame to a lens position for each frame, the determined lens position being an estimate of the position of the lens for optimum focus of light propagating through the lens to the imaging device for the determined distance; and
         moving the lens towards the determined lens position while the scene is changing; and
   in response to determining the scene is no longer changing for a predetermined duration, initiating an autofocus search operation.

2. The method of claim 1, wherein the imaging device is configured to operate in continuous autofocus mode.

3. The method of claim 1, further comprising monitoring the plurality of frames, wherein monitoring the plurality of frames includes determining a change quantifier for each frame and comparing the change quantifier for each frame to a threshold change quantifier.

4. The method of claim 3, wherein the change quantifier is at least one of: a luma quantifier, a movement quantifier, and a distance quantifier.

5. The method of claim 3, wherein a change in the scene is detected when the change quantifier for at least one frame is greater than the threshold change quantifier.

6. The method of claim 1, wherein said determining a lens position for each frame further comprises:
reporting the determined distance for each frame by the distance sensor; and
receiving the determined distance for each frame;
wherein converting the determined distance for each frame to the lens position for each frame is based on at least one of: an anchor distance, an anchor lens position, and at least one imaging device specification.

7. The method of claim 1, further comprising determining a near and a far boundary limits based on the determined lens position.

8. The method of claim 7, wherein said moving the lens toward the lens position further comprises moving the lens toward the near boundary.

9. The method of claim 8, wherein said initiating an autofocus search operation further comprises performing a fine autofocus search operation to determine an actual optimal focus lens position, wherein the actual optimal focus lens position is between the near and far boundary limits.

10. The method of claim 1, wherein the predetermined duration includes a predetermined number of successive frames.

11. An imaging apparatus comprising:
a lens, configured to focus light from a scene at a focal plane of the lens;
an image sensor, positioned approximately at the focal plane of the lens, configured to capture a plurality of frames depicting the scene based on the focused light from the scene;
a distance sensor, configured to detect a distance between an object of the scene and the imaging device;
a processor, operably coupled to the image sensor and lens; and
a memory component, operably coupled to the processor, the processor, the distance sensor, and the memory component collectively configured to:
prior to initiating an autofocus search operation, detect a change in the scene, and while the scene is changing:
capture, with the imaging device, the plurality of frames depicting the scene, a portion of the scene corresponding to the object;
for each of the plurality of frames:
determine, using the distance sensor, a distance between the object and the imaging device;
determine a lens position for the frame based on the determined distance by converting the determined distance for each frame to a lens position for each frame, the determined lens position being an estimate of the position of the lens for optimum focus of light propagating through the lens to the imaging device for the determined distance; and
move the lens towards the determined lens position while the scene is changing; and
in response to determining the scene is no longer changing for a predetermined duration, initiate an autofocus search operation.

12. The apparatus of claim 11, wherein the distance sensor comprises at least one of a laser sensor and a dual camera system.

13. The apparatus of claim 11, wherein processor and the memory component are further configured to:
monitor the plurality of frames;
determine a change quantifier for each frame; and
compare the change quantifier for each frame to a threshold change quantifier.

14. The apparatus of claim 13, wherein the change quantifier is at least one of: a luma quantifier, a movement quantifier, and a distance quantifier.

15. The apparatus of claim 13, wherein the processor and the memory component are configured to detect a change in the scene when the change quantifier for at least one frame is greater than the threshold change quantifier.

16. The apparatus of claim 11, wherein the distance sensor is further configured to report the determined distance for each frame.

17. The apparatus of claim 16, wherein the processor, the distance sensor, and the memory component are configured to:
receive the detected distance for each frame;
wherein converting the determined distance for each frame to the lens position for each frame is based on at least one of: an anchor distance, an anchor lens position, and at least one imaging device specification.

18. The apparatus of claim 11, wherein the processor and memory component are further configured to determine a near and a far boundary limit based on the estimate of the optimal focus lens position.

19. The apparatus of claim 18, wherein the processor and the memory component are further configured to move the lens toward the near boundary.

20. The apparatus of claim 19, wherein the processor and the memory component are further configured to perform a fine autofocus search operation to determine an actual optimal focus lens position, wherein the actual optimal focus lens position is between the near and far boundary limits.

21. The apparatus of claim 18, wherein the memory component comprises at least one of: an input processing module, a change determination module, a lens position determination module, a lens control module, a stability determination module, an autofocus control module, and a boundary limit determination module.

22. The imaging apparatus of claim 11, wherein the predetermined duration includes a predetermined number of successive frames.

23. An apparatus for reducing defocus events occurring during autofocus search operations, the apparatus comprising:
a means for detecting a change in a scene;
a means for capturing a plurality of frames depicting the scene while the scene is changing prior to initiating an autofocus search operation, a portion of the scene corresponding to an object;
a means for determining a distance between the object and the imaging device for each frame of the plurality of frames;
a means for determining a lens position for each frame based on the determined distance for each frame by converting the determined distance for each frame to a lens position for each frame, the determined lens position being an estimate of the position of the lens for optimum focus of light propagating through the lens to the imaging device for the determined distance frame;

a means for moving the lens toward the lens position determined for each frame while the scene continues to change;

a means for determining the scene is no longer changing for a predetermined duration; and a means for initiating an autofocus search operation based on the determination that the scene is no longer changing for the predetermined duration.

24. The apparatus of claim 23, further comprising a means for reporting the determined distance for each frame.

25. The apparatus of claim 24, wherein the means for determining a lens position is configured to:

receive the determined distance for each frame;

wherein converting the determined distance for each frame to the lens position for each frame is based on at least one of: an anchor distance, an anchor lens position, and at least one imaging device specification.

26. The apparatus of claim 23, further comprising a means for determining a near and a far boundary limit based on the estimate of the optimal focus lens position.

27. The apparatus of claim 26, wherein said means for moving the lens is further configured to move the lens toward the near boundary.

28. The apparatus of claim 23, wherein the predetermined duration includes a predetermined number of successive frames.

29. A non-transitory computer readable medium comprising instructions that when executed cause a processor to perform a method for reducing defocus events occurring during autofocus search operations, the method comprising:

prior to initiating an autofocus search operation, detecting a change in a scene, and while the scene is changing:

capturing, with an imaging device, a plurality of frames depicting the scene, a portion of the scene corresponding to an object;

for each of the plurality of frames:

determining, using a distance sensor, a distance between the object and the imaging device;

determining a lens position for the frame based on the determined distance by converting the determined distance for each frame to a lens position for each frame, the determined lens position being an estimate of the position of the lens for optimum focus of light propagating through the lens to the imaging device for the determined distance; and moving the lens toward the determines lens position while the scene is changing; and in response to determining the scene is no longer changing for a predetermined duration, initiating an autofocus search operation.

30. The method of claim 29, wherein said determining a lens position for each frame further comprises:

reporting the determined distance for each frame by the distance sensor; and receiving the determined distance for each frame;

wherein converting the determined distance for each frame to the lens position for each frame is based on at least one of: an anchor distance, an anchor lens position, and at least one imaging device specification.

31. The method of claim 29, further comprising determining a near and a far boundary limits based on the lens position.

32. The method of claim 31, wherein said moving the lens toward the lens position further comprises moving the lens toward the near boundary.

* * * * *